United States Patent
Yamashita (10) Patent No.: US 6,725,133 B2
(45) Date of Patent: Apr. 20, 2004

(54) ATTITUDE DETECTION SYSTEM FOR ARTIFICIAL SATELLITE

(75) Inventor: Toshiaki Yamashita, Tokyo (JP)

(73) Assignee: NEC Corporation (JP)

( * ) Notice: Subject to any disclaimer, the term of this patent is extended or adjusted under 35 U.S.C. 154(b) by 7 days.

(21) Appl. No.: 10/189,906

(22) Filed: Jul. 2, 2002

(65) Prior Publication Data

US 2003/0004620 A1 Jan. 2, 2003

(30) Foreign Application Priority Data

Jul. 2, 2001 (JP) ........................................ 2001-201123

(51) Int. Cl.[7] .................................................. B64G 3/00
(52) U.S. Cl. ............................ 701/13; 701/4; 244/171
(58) Field of Search .............................. 701/13, 226, 4; 244/164, 165, 171

(56) References Cited

U.S. PATENT DOCUMENTS 6,102,338 A * 8/2000 Yoshikawa et al. ......... 244/171
6,227,496 B1 * 5/2001 Yoshikawa et al. ......... 244/171
6,463,364 B2 * 10/2002 Yamashita ...................... 701/4
6,523,786 B2 * 2/2003 Yoshikawa et al. ......... 244/171

FOREIGN PATENT DOCUMENTS

JP    2000-265553    9/2000

* cited by examiner

Primary Examiner—Gary Chin
(74) Attorney, Agent, or Firm—Ostrolenk, Faber, Gerb & Soffen, LLP

(57) ABSTRACT

An attitude detection system for an artificial satellite includes an interpolator for interpolating an angular-velocity signal to generate an interpolated angular-velocity signal, a sequential Kalman filter for generating a low-frequency attitude-angle signal, and an adder for adding the low-frequency attitude-angle signal and a high-frequency attitude-angle signal generated by a high-frequency angular sensor to generate a broad-band attitude-angle signal.

8 Claims, 6 Drawing Sheets

ATTITUDE DETECTION SYSTEM FOR ARTIFICIAL SATELLITE

BACKGROUND OF THE INVENTION

1. Field of the Invention

The present invention relates to an attitude detection system for an artificial satellite and, more particularly, to an attitude detection system for detecting the attitude angle of an artificial satellite in a ground station, which is capable of accurately detecting fluctuation of the attitude angle of the artificial satellite over a broad frequency band. The present invention also relates to a method for detecting the attitude angle of the artificial satellite.

2. Description of the Related Art

Figure 1:
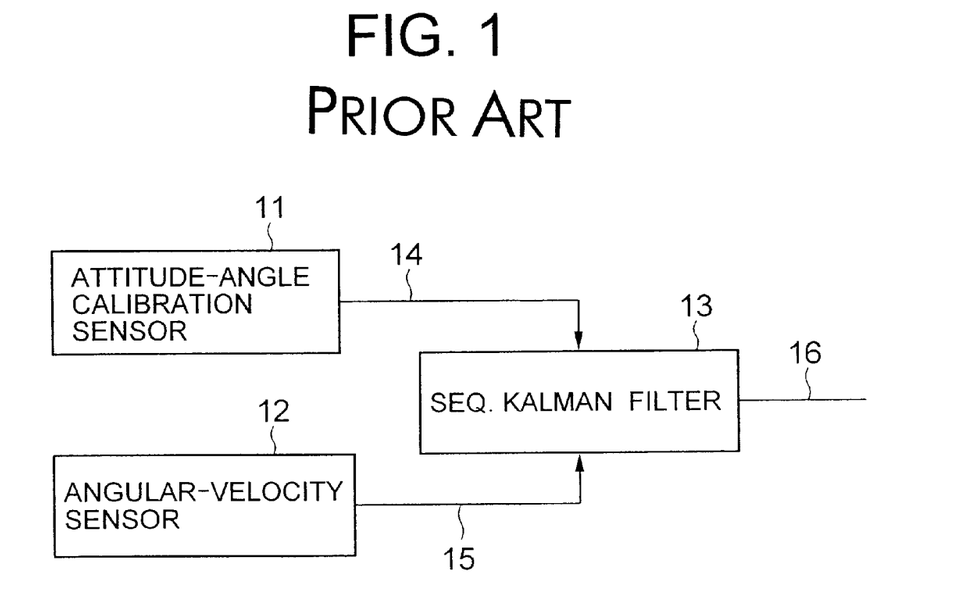
FIG. 1 is a block diagram of a conventional attitude detection system for an artificial satellite.

The attitude of an artificial satellite residing in the space is generally observed from a ground station. FIG. 1 shows an example of the conventional attitude detection system, which includes an attitude-angle calibration sensor 11 for sampling the attitude angle of the artificial satellite at a low frequency to generate an attitude-angle calibration signal 14, an angular-velocity sensor 12 for detecting the angular velocity of the artificial satellite to generate an angular-velocity signal 15 and a sequential Kalman filter 13 for estimating the attitude, i.e., the attitude angle of the artificial satellite by integrating the angular-velocity signal 15 with respect to time while calibrating the integrated data based on the attitude-angle calibration signal 14 at a specified time interval.

Examples of the angular-velocity sensor 12 include a gyroscope, and examples of the attitude-angle calibration sensor 11 include a start tracker. In the sequential Kalman filter 13, the noise characteristics of the attitude-angle calibration sensor 11 and the angular-velocity sensor 12, which are mounted on the artificial satellite, are modeled by using a probability model technique, thereby estimating and removing the noise included in the angular-velocity signal 15 and the attitude-angle calibration signal 14.

The attitude detection system shown in FIG. 1 has a relatively simple structure, and is originally developed as an on-board processing system, i.e., a real-time processing system on the artificial satellite. However, since the ground station can also extract time-series data of the angular-velocity signal 15 and the attitude-angle calibration signal 14 from the telemetry data received by the ground station, the attitude detection system of FIG. 1 is generally and widely used as an on-board processing system as well as a ground processing system.

In the conventional attitude detection system of FIG. 1, although the attitude-angle calibration sensor 11 generally has a higher accuracy compared to the angular-velocity sensor 12, the attitude-angle calibration sensor 11 has a longer measurement cycle which is, for example, more than 10 times longer compared to the measurement cycle of the angular-velocity sensor 12. Accordingly, even if the measurement cycle of the angular-velocity sensor 12 may be significantly improved, the frequency band of the final attitude-angle signal 16 obtained thereby is relatively limited due to the waste time caused by the characteristics of the attitude-angle calibration sensor 11.

It may be considered that the angular-velocity sensor 12 alone is used for obtaining the attitude-angle signal 16 to improve the measurement cycle. However, in this case, there arises a problem that the noise involved in the angular-velocity signal 15 largely affects and degrades the accuracy of the calculated attitude-angle signal 16, although it is possible to detect the fluctuation of the attitude angle of the artificial satellite itself in a higher frequency range.

JP Application 2000-265553 proposes an attitude detection system for an artificial satellite which can solve the above problem in the conventional technique. The proposed system includes an on-board high-frequency attitude-angle sensor, in addition to the attitude-angle calibration sensor 11 and the angular-velocity sensor 12 shown in FIG. 1, thereby generating a broad-band attitude-angle signal.

Figure 2:
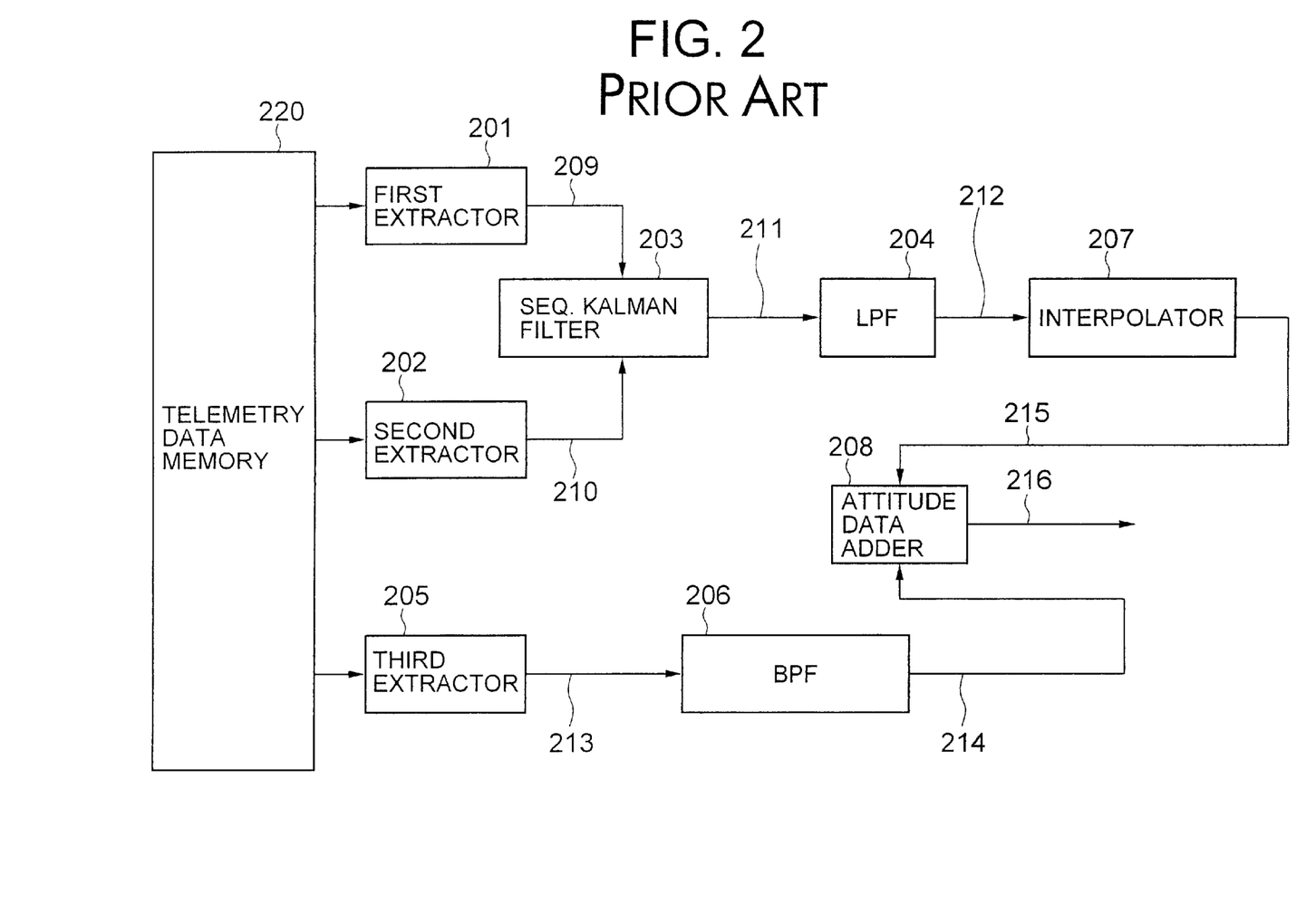
FIG. 2 is a block diagram of the attitude detection system proposed in the JP patent application.

FIG. 2 shows the proposed system, which includes a telemetry data memory 220 for storing the telemetry data received from the artificial satellite, a first data extractor 201 for extracting attitude-angle calibration data 209 as time-series data from the telemetry data memory 220, a second data extractor 202 for extracting angular-velocity data 210 as time-series data from the telemetry data memory 220, and a third data extractor 205 for extracting high-frequency attitude-angle data as time series data from the telemetry data memory 220.

An angular displacement sensor using a liquid is used as the on-board high-frequency attitude-angle sensor 205, whereby the attitude angle of the artificial satellite can be detected at a higher frequency compared to the angular-velocity data 210. The high-frequency attitude-angle signal, stored in the telemetry data memory 220, is extracted by the third data extractor 205 as a high-frequency attitude-angle signal 213.

The sequential Kalman filter 203 generates an attitude-angle signal 211 based on the attitude-angle calibration signal 209 and the angular-velocity signal 210 extracted by the first data extractor 201 and the second data extractor 202, respectively, from the telemetry data memory 220. The attitude-angle signal 211 generated by the sequential Kalman filter 203 is passed by a low-pass filter 204, interpolated in an interpolator 207, and then delivered to an attitude data adder 208 as a low-frequency interpolated signal 215.

The high-frequency attitude-angle signal 213 extracted by the third data extractor 205 is passed by a band-pass-filter 206 and then delivered to the attitude data adder 208 as a high-frequency attitude signal 214. The attitude data adder 208 adds both the low-frequency interpolated signal 215 and the high-frequency attitude signal 214 together to generate a high-accuracy broad-band attitude-angle signal 216.

In the proposed system of FIG. 2, as described above, the low-frequency attitude signal 212 obtained by the sequential Kalman filter 203 and the low-pass filter 204 is interpolated in the interpolator 207, and then added to the high-frequency attitude signal 214 in the attitude data adder 208 to obtain the high-accuracy attitude signal 216.

In the above operation of the sequential Kalman filter 203, the angular-velocity signal 210 is sampled at a specified time interval corresponding to the measurement interval of the angular-velocity sensor, and integrated with respect to time while being calibrated based on the attitude-angle calibration signal 209. In general, a shorter step interval for the integration provides a higher accuracy. However, in the proposed system, the step interval in the integration is determined by the frequency, or the measurement cycle, of the angular-velocity sensor which has a relatively limited performance as to the measurement cycle, and thus an accurate broad-band attitude-angle signal by the system is difficult to expect.

SUMMARY OF THE INVENTION

In view of the above problems in the conventional attitude detection system and the proposed attitude detection system proposed in JP Application 2000-265553, it is an object of the present invention to provide an attitude detection system for an artificial satellite, which is capable of detecting a broad-band attitude-angle signal for the artificial satellite with improved accuracy.

It is another object of the present invention to provide a method for detecting a broad-band attitude-angle signal for the artificial satellite with improved accuracy.

The present invention provides an attitude detection system for an artificial satellite including a telemetry data memory for storing telemetry data received from the artificial satellite, a first data extractor for extracting attitude-angle calibration data from the telemetry data memory as time-series data, a second data extractor for extracting angular-velocity data from the telemetry data memory as time-series data, an interpolator for interpolating the angular-velocity data to generate interpolated angular-velocity data, a sequential Kalman filter to generate a low-frequency attitude-angle signal from the interpolated angular-velocity data and the attitude-angle calibration data, a third extractor for extracting high-frequency attitude-angle data as time series data from the telemetry data memory to generate a high-frequency attitude-angle signal, and an adder for adding the low-frequency attitude-angle signal and the high-frequency attitude-angle signal together to generate a broad-band attitude-angle signal.

The present invention also provides a method for detecting attitude of an artificial satellite, including the steps of: storing telemetry data received from the artificial satellite, extracting attitude-angle calibration data from the telemetry data memory as time-series data, extracting angular-velocity data from the telemetry data memory as time-series data, interpolating the angular-velocity data to generate interpolated angular-velocity data, generating a low-frequency attitude-angle signal from the interpolated angular-velocity data and the attitude-angle calibration data, extracting high-frequency attitude-angle data as time series data from the telemetry data memory to generate a high-frequency attitude-angle signal, and adding the low-frequency attitude-angle signal and the high-frequency attitude-angle signal together to generate a broad-band attitude-angle is signal.

In the attitude detection system of the present invention, the sequential Kalman filter has a shorter step interval in the integration, which corresponds to the data interval of the interpolated angular-velocity data in the interpolated angular-velocity signal and is thus shorter than the sampling interval of the original angular-velocity signal. Thus, the integrated data obtained by the sequential Kalman filter has a higher accuracy compared to that obtained in the proposed system. That is, this configuration provides a higher accuracy in the low-frequency attitude-angle signal. Although high-frequency noise is increased by the shorter step interval in the integration and errors of the interpolated attitude-angle signal are caused by the interpolation in the low-frequency attitude-angle signal are, these noise and the errors are cancelled by addition of the high-frequency attitude-angle signal to the low-frequency attitude-angle signal. The method of the present invention also achieves a similar advantage.

The above and other objects, features and advantages of the present invention will be more apparent from the following description, referring to the accompanying drawings.

PREFERRED EMBODIMENTS OF THE INVENTION

Now, the present invention is more specifically described with reference to the accompanying drawing.

Figure 3:
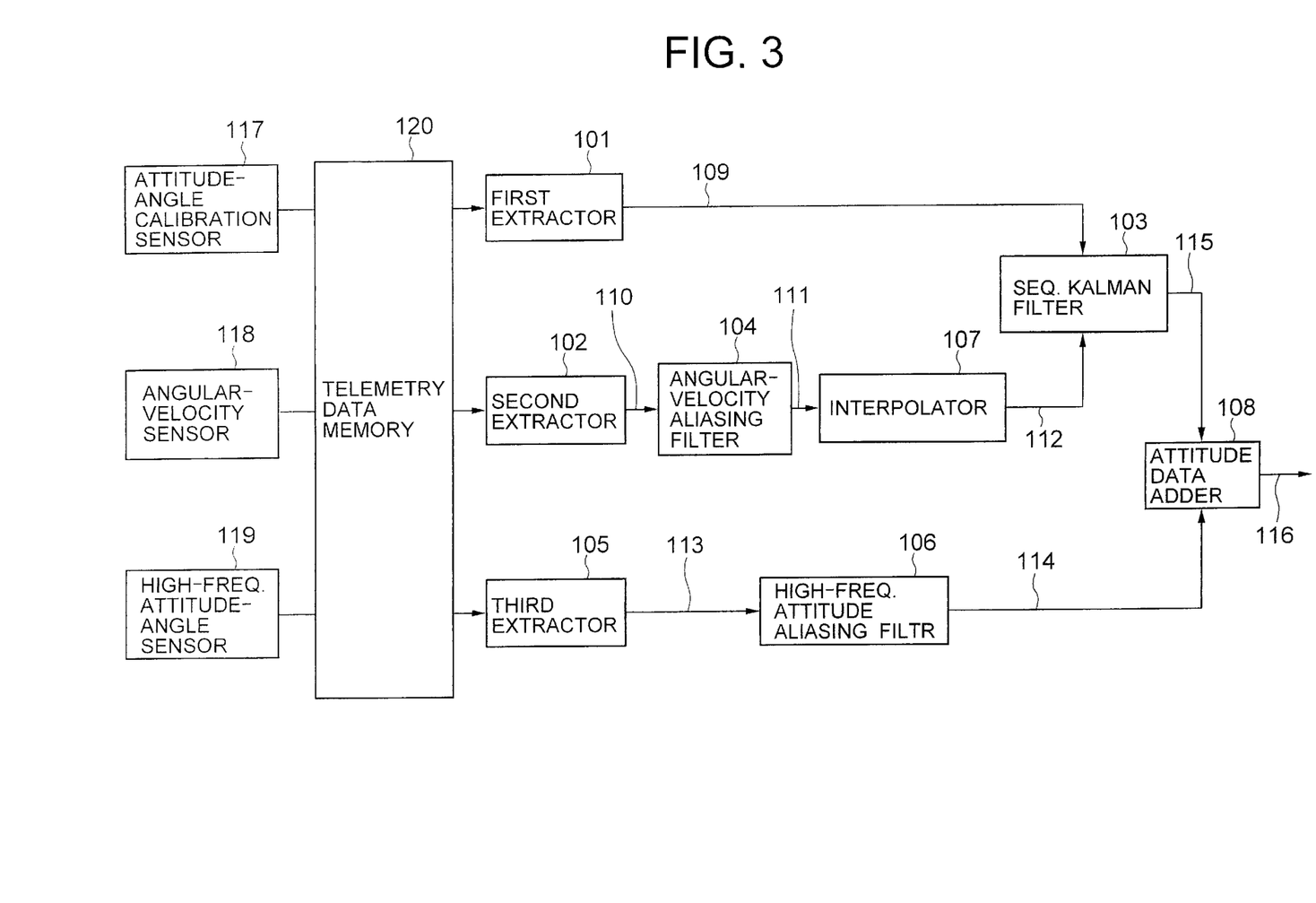
FIG. 3 is a block diagram of an attitude detection system according to an embodiment of the present invention.

Referring to FIG. 3, an attitude detection system according to an embodiment of the present invention is provided in a ground station and operates in association with on-board sensors 117 to 119 mounted on an artificial satellite. The on-board sensors include an attitude-angle calibration sensor 117 for detecting the attitude angle of the artificial satellite to generate an attitude-angle calibration signal, an angular-velocity sensor 118 for detecting the angular velocity of the artificial satellite to generate an angular-velocity signal, and a high-frequency attitude-angle sensor 119 for detecting the attitude angle of the artificial satellite to generate a high-frequency attitude-angle signal. The term "high frequency" as used herein means a relative expression, wherein the attitude-angle sensor 119 has a higher operational speed and generates a higher-frequency signal compared to the operational speed and the signal frequency of the angular-velocity sensor 118.

The attitude detection system of FIG. 3 includes a telemetry data memory 120 for storing the telemetry data received from the artificial satellite, a first data extractor 101 for extracting attitude-angle calibration data from the telemetry data memory 120, a second data extractor 102 for extracting angular-velocity data from the telemetry data memo 120, a third data extractor 105 for extracting high-frequency attitude-angle data from the telemetry data memory 120, a sequential Kalman filter 103 having a shorter step interval in the integration of the angular velocity signal compared to the sampling interval of the angular-velocity sensor 118, an angular-velocity data aliasing filter 104 for receiving an angular-velocity signal 110 extracted by the second data extractor 102, a high-frequency attitude-angle data aliasing filter 106 for receiving a high-frequency attitude-angle signal 113 extracted by the third data extractor 105, an interpolator 107 for interpolating the corrected angular-velocity signal 111 received from the angular-velocity data aliasing filter 104, and an attitude-angle data adder 108 for receiving a high-frequency attitude-angle signal 114 from the high-frequency data aliasing filter 106 and a low-frequency attitude-angle signal 115 from the sequential Kalman filter 103.

The sequential Kalman filter 103 receives the interpolated angular-velocity signal 112 from the interpolator 107 and the attitude-angle calibration signal 109 extracted by the first data extractor 101, to generate the low-frequency attitude signal 115 by integrating the interpolated angular-velocity signal 112 while calibrating the same based on the attitude-angle calibration signal 109. The attitude data adder 108 adds the low-frequency attitude-angle signal 115 to the high-frequency attitude-angle signal 114 received from the high-frequency attitude data aliasing filter 106, thereby generating a broad-band attitude-angle signal 116.

The artificial satellite periodically forwards a variety of telemetry data detected on the orbit of the artificial satellite. The telemetry data memory 120 successively stores the telemetry data as time-series data. The first through third data extractors 101, 102 and 105 operate at different cycles and extract at least the telemetry data which are detected at a time, to deliver the attitude-angle calibration signals 109, the angular-velocity signal 110 and the high-frequency attitude-angle signal 113, respectively.

The angular-velocity data aliasing filter 104 is implemented by a low-pass filter of a first power or more sequential number of power, which has a cut-off frequency equal to half the sampling frequency of the angular-velocity sensor 118. The angular-velocity data aliasing filter 104 passes the low-frequency components of the angular-velocity signal 110 to output the corrected angular-velocity signal 111.

The interpolator 107 receives the corrected angular-velocity signal 111 to deliver the interpolated angular-velocity signal 112. The interpolator 107 interpolates data in the corrected angular-velocity signal 110 to increase the number of data in the corrected angular-velocity signal 111 so that the interpolated angular-velocity signal 111 has a number of data each corresponding to one of the data in the high-frequency attitude-angle signal 113. In other words, the interpolated angular-velocity signal 112 is obtained as time-series data sampled at a pseudo sampling cycle equal to the sampling cycle of the high-frequency attitude-angle signal 113.

The sequential Kalman filter 103 integrates the interpolated angular-velocity signal 112 at a step interval equal to the sampling cycle of the high-frequency attitude-angle signal 113 while using the attitude-angle calibration signal 109 as calibration data, thereby generating a low-frequency attitude-angle signal 115. It is to be noted that the interpolated angular-velocity signal 112 has a probability of a lower accuracy compared to the corrected angular-velocity signal 111.

The sequential Kalman filter 103 changes the relative relationship between the noise model value of the attitude-angle calibration sensor 117 and the noise model value of the angular-velocity sensor 118 in a considerably amount from the design value which is provided as a hardware characteristic, the relative relationship being the design parameter of the sequential Kalman filter 103.

More specifically, the sequential Kalman filter 103 changes the predetermined value of the noise model of the angular-velocity sensor 118 provided as the specification value to a higher value, in order to suppress degradation of the accuracy caused by the interpolation in the interpolated angular-velocity signal 112 and maintain the accuracy of the low-frequency attitude signal 115 generated in the sequential Kalman filter 103. It is to be noted that a strict setting is required of the attitude-angle calibration sensor 17 in this case. In view of this, it is preferable to use an attitude-angle calibration sensor 117 having an excellent noise characteristic to obtain an accurate low-frequency attitude signal 115.

The high-frequency attitude-angle data aliasing filter 106 is implemented by a low-pass filter of a first-power function or a higher-power function having a cut-off frequency equal to half the sampling frequency of the high-frequency attitude-angle sensor 119. The high-frequency attitude-angle data aliasing filter 106 receives the high-frequency attitude-angle signal 113 to deliver the high-frequency attitude signal 114.

The attitude data adder 108 receives the low-frequency attitude-angle signal 115 and the high-frequency attitude-angle signal 114, add together the corresponding data, which correspond to each other in the detected time, in both the signals 114 and 115, and delivers a broad-band attitude-angle signal 116 representing the attitude angle of the artificial satellite at a higher accuracy.

The above embodiment is directed to a broad-band attitude detection system provided in the ground station which receives the telemetry data from the artificial satellite.

In the above embodiment, interpolation of the corrected angular-velocity signal 111 assists the sequential Kalman filter 103 to integrate the angular-velocity signal by using a short step interval corresponding to the sampling cycle of the high-frequency attitude-angle sensor 119. The interpolation in the interpolator 107 uses a linear interpolation in this embodiment, wherein the interpolation is conducted by using a straight line passing two adjacent data actually obtained by the angular velocity sensor 118, to generate interpolated angular-velocity signal 112 corresponding to a higher sampling frequency. Addition of the low-frequency attitude signal 115 obtained from the angular-velocity sensor 118 which samples the angular velocity at a lower frequency and the high-frequency attitude signal 114 obtained from the high-frequency attitude-angle sensor 119 which samples the attitude-angle at a higher frequency achieves an accurate broad-band attitude signal.

A simulation is conducted using simulation data representing fluctuation of the artificial satellite for evaluating the above embodiment. The simulation data, depicted in FIG. 4, includes a large number of frequency components, residing between 0.05 Hz and 50 Hz especially in the time range between five seconds and ten seconds elapsed since the start of the simulation.

Figure 4:
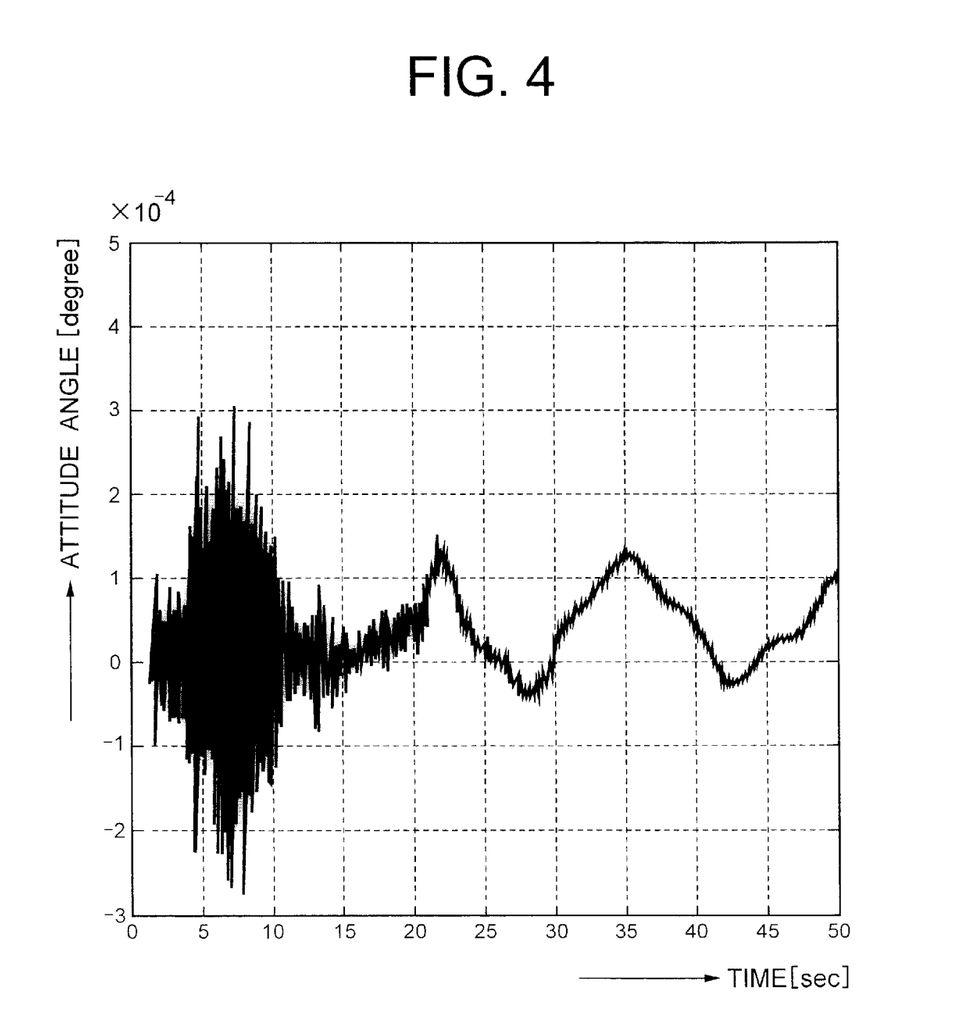
FIG. 4 is a graph showing simulation data in a simulation, representing the attitude angle of an artificial satellite, which was used for evaluation of the first embodiment.
Figure 5:
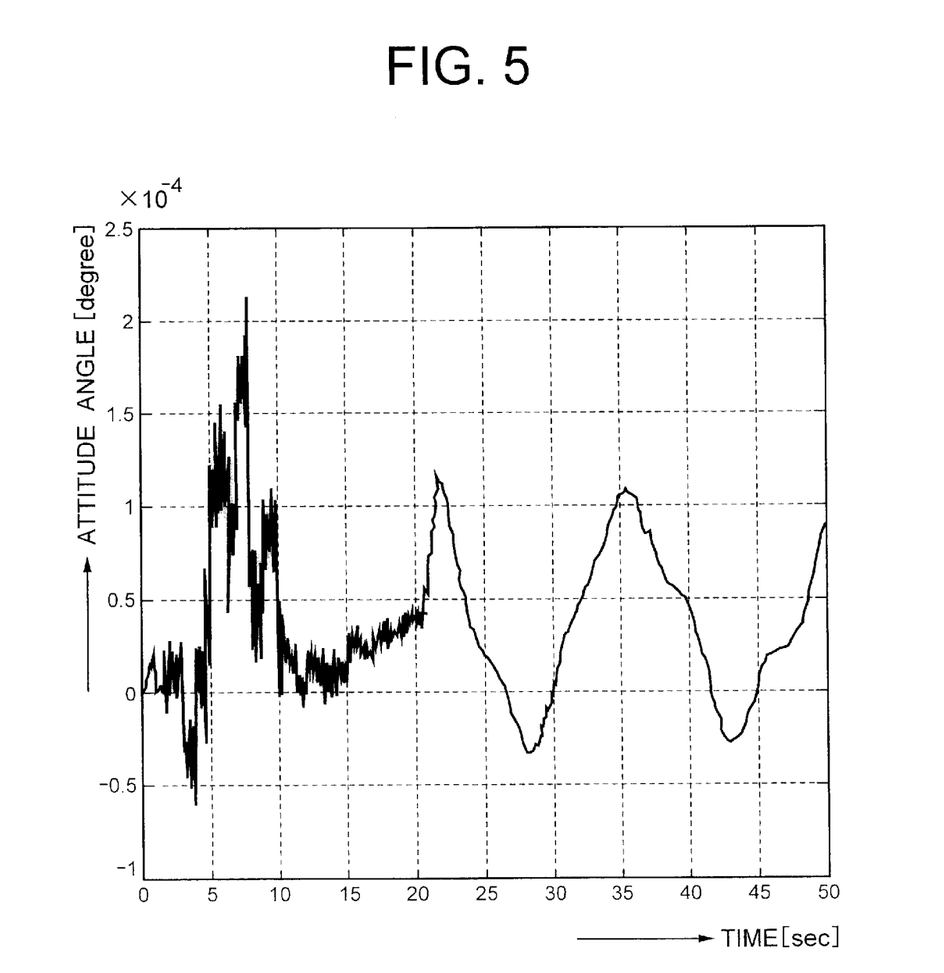
FIG. 5 is a graph showing the attitude angle of the artificial satellite obtained in the simulation by the conventional attitude detection system of FIG. 1 in the case of the fluctuation of the satellite shown in FIG. 4.

Referring to FIG. 5, the attitude angle detected by the conventional attitude detection system of FIG. 1 in the simulation includes only limited frequency components having lower frequencies. That is, the conventional attitude detection system could not detect the high-frequency components of the fluctuation of the attitude angle of the artificial satellite shown in FIG. 4, because the sampling frequency of the angular-velocity sensor 118 limits the frequency range of the attitude-angle signal 116 in the conventional system of FIG. 1. It is to be noted that the sampling cycle of the angular-velocity sensor 118 is set at 0.1 second in the simulation, which resulted in degraded detection accuracy of the fluctuation. That is, the high-frequency components of the fluctuation residing in the time range between the five seconds and the ten seconds could not be detected by the conventional system.

Figure 6:
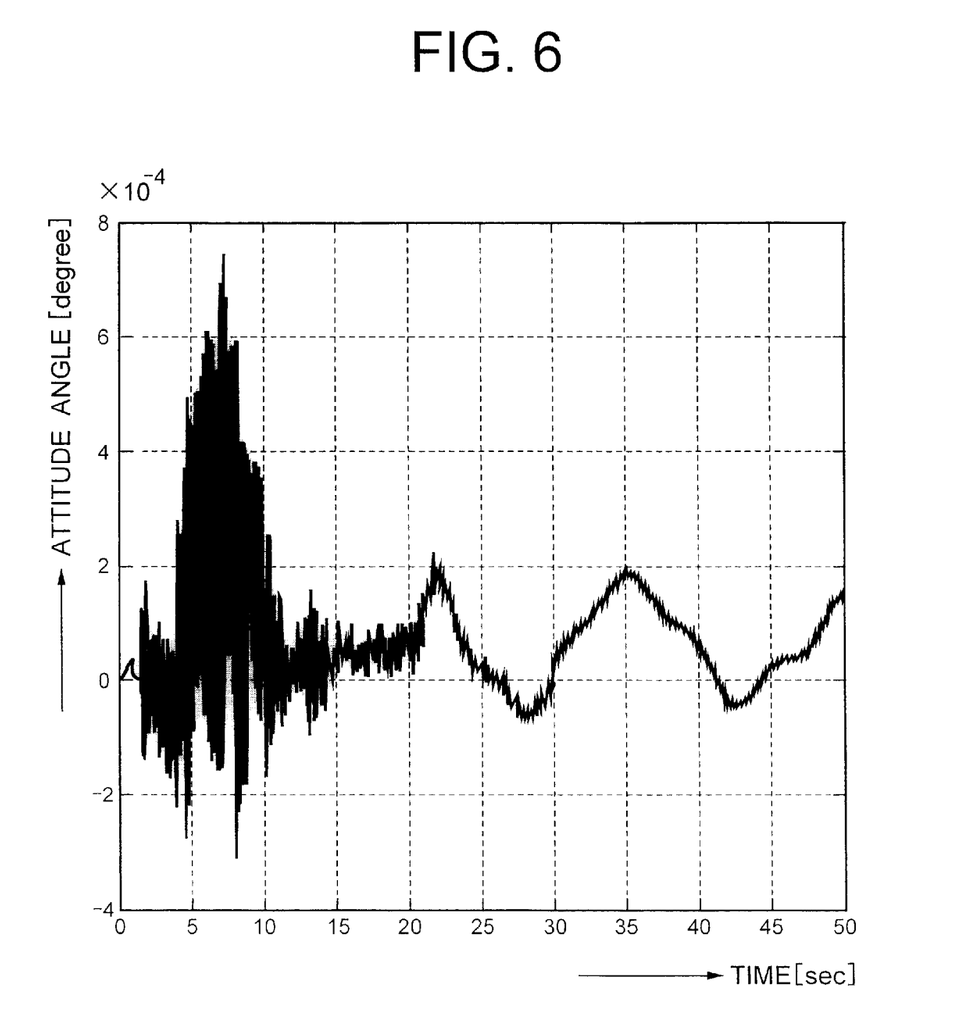
FIG. 6 is a graph showing the attitude angle of the artificial satellite obtained in the simulation by the attitude detection system of the embodiment in the case of the fluctuation of the satellite shown in FIG. 4.

Referring to FIG. 6, the attitude angle in the broad-band attitude-angle signal 116 detected by the attitude detection system of FIG. 3 in the simulation includes high-frequency components well following the fluctuated angle of FIG. 4 especially in the time range between five seconds and ten seconds. The interpolator 107 used a linear interpolation, whereas the sequential Kalman filter 103 used the interpolated angular-velocity signal 112 and the attitude-angle calibration signal 109 after changing the noise parameters thereof.

In a modification of the above embodiment, the interpolator 107 uses a spline interpolation, wherein the angular velocities residing between adjacent two detected data of the angular velocity are approximated by a function having suitable power terms. The function may have a plurality of terms having respective powers of time for approximation.

The spline interpolation approximates undetected data residing between adjacent two of the actually detected data by using a function having a third or more power term as a maximum power term, thereby more accurately approximating the undetected data compared to the linear interpolation. The suitable maximum power of the terms in the function may be between around third power to around sixth power to obtain optimum results.

Since the above embodiments are described only for examples, the present invention is not limited to the above embodiments and various modifications or alterations can be easily made therefrom by those skilled in the art without departing from the scope of the present invention.

What is claimed is:

1. An attitude detection system for an artificial satellite comprising a telemetry data memory for storing telemetry data received from the artificial satellite, a first data extractor for extracting attitude-angle calibration data from said telemetry data memory as time-series data, a second data extractor for extracting angular-velocity data from said telemetry data memory as time-series data, an interpolator for interpolating said angular-velocity data to generate interpolated angular-velocity data, a sequential Kalman filter for generating a low-frequency attitude-angle signal from said interpolated angular-velocity data and said attitude-angle calibration data, a third extractor for extracting high-frequency attitude-angle data as time-series data from said telemetry data memory to generate a high-frequency attitude-angle signal, and an adder for adding said low-frequency attitude-angle signal and said high-frequency attitude-angle signal to generate a broad-band attitude-angle signal.

2. The attitude detection system as defined in claim 1, wherein said interpolator uses a liner interpolation.

3. The attitude detection system as defined in claim 1, wherein said interpolator uses a spline interpolation.

4. The attitude detection system as defined in claim 1, wherein a low-pass filter is interposed between said second data extractor and said interpolator.

5. A method for detecting attitude of an artificial satellite, comprising the steps of: storing telemetry data received from the artificial satellite, extracting attitude-angle calibration data from said telemetry data memory as time-series data, extracting angular-velocity data from said telemetry data memory as time-series data, interpolating said angular-velocity data to generate interpolated angular-velocity data, generating a low-frequency attitude-angle signal from said interpolated angular-velocity data and said attitude-angle calibration data, extracting high-frequency attitude-angle data as time series data from said telemetry data memory to generate a high-frequency attitude-angle signal, and adding said low-frequency attitude-angle signal and said high-frequency attitude-angle signal together to generate a broad-band attitude-angle signal.

6. The method as defined in claim 5, wherein said interpolating step uses a liner interpolation.

7. The method as defined in claim 5, wherein said interpolating step uses a spline interpolation.

8. The method as defined in claim 5, wherein said interpolating step interpolates said angular-velocity data after passing said angular-velocity data through a low-pass filter.

* * * * *